US008766222B2

(12) United States Patent
Wunderer et al.

(10) Patent No.: US 8,766,222 B2
(45) Date of Patent: Jul. 1, 2014

(54) METHOD AND APPARATUS FOR CHECKING THE USAGE STATE OF DOCUMENTS OF VALUE

(75) Inventors: Bernd Wunderer, Naples, FL (US); Shanchuan Su, Neubiberg (DE)

(73) Assignee: Giesecke & Devrient GmbH, Munich (DE)

( * ) Notice: Subject to any disclaimer, the term of this patent is extended or adjusted under 35 U.S.C. 154(b) by 323 days.

(21) Appl. No.: 13/141,153

(22) PCT Filed: Dec. 21, 2009

(86) PCT No.: PCT/EP2009/067677
§ 371 (c)(1), (2), (4) Date: Jun. 21, 2011

(87) PCT Pub. No.: WO2010/072732
PCT Pub. Date: Jul. 1, 2010

(65) Prior Publication Data

US 2011/0255750 A1 Oct. 20, 2011

(30) Foreign Application Priority Data

Dec. 22, 2008 (DE) ........................ 10 2008 064 388

(51) Int. Cl.
*G06K 5/00* (2006.01)
*G06K 9/74* (2006.01)

(52) U.S. Cl.
USPC ........................................... 250/556; 356/71

(58) Field of Classification Search
USPC ................ 250/556; 382/135; 356/71; 283/85
See application file for complete search history.

(56) References Cited

U.S. PATENT DOCUMENTS

| | | | |
|---|---|---|---|
| 5,938,334 A | | 8/1999 | Kayani |
| 6,040,584 A | * | 3/2000 | Liu et al. ................. 250/559.11 |
| 6,064,478 A | | 5/2000 | Paul et al. |
| 6,498,867 B1 | | 12/2002 | Potucek et al. |
| 6,741,727 B1 | * | 5/2004 | Hirasawa ...................... 382/112 |
| 2003/0042443 A1 | | 3/2003 | Pechan et al. |
| 2007/0258621 A1 | | 11/2007 | Kato et al. |

FOREIGN PATENT DOCUMENTS

| | | |
|---|---|---|
| DE | 195 11 534 A1 | 10/1996 |
| DE | 10139717 | 2/2003 |
| DE | 10 2005 031 490 A1 | 2/2007 |
| EP | 1011079 | 6/2000 |
| EP | 1785951 | 5/2007 |
| WO | 2008/020208 A1 | 2/2008 |

OTHER PUBLICATIONS

German Search Report in corresponding German Application No. 10 2008 064 388.2, dated Dec. 7, 2009.
International Search Report in PCT/EP2009/067677, Mar. 17, 2010.

* cited by examiner

*Primary Examiner* — Thanh Luu
(74) *Attorney, Agent, or Firm* — Workman Nydegger

(57) ABSTRACT

The invention relates to an apparatus and a method for checking the usage state of a document of value. The document of value is illuminated with illumination light and with the help of an image sensor there is detected the light intensity of the light reflected from the document of value in order to take an image of the document of value. Of the taken image there is chosen an image detail in which there is imaged an opaque, reflective section of the document of value. The chosen image detail is examined for signs of creases which are possibly present in the opaque, reflective section of the document of value. The results of the examination for creases are used to evaluate the usage state of the document of value.

15 Claims, 4 Drawing Sheets

METHOD AND APPARATUS FOR CHECKING THE USAGE STATE OF DOCUMENTS OF VALUE

BACKGROUND OF THE INVENTION

1. Field of the Invention

The invention relates to a method and an apparatus for checking documents of value, in particular for checking the usage state of documents of value.

2. Related Art

With the passing of time that documents of value, such as e.g. bank notes, are in circulation or in use, the usage state thereof deteriorates. The usage state may diminish to the unserviceability of the documents of value. In order to recognize a poor usage state in time, documents of value are therefore regularly checked by machine for their usage state and if their usage state is judged to be too poor are automatically sorted out. The check of the usage state is usually carried out e.g. in cash deposit and/or dispensing machines for bank notes or also in bank note sorting machines, whereby the authenticity and the denomination of the bank notes is also checked.

For checking the usage state of a document of value, in particular the fitness of the document of value, the document of value is usually examined for the presence of tears or dog-ears. Additionally, there can also be checked the soiling of the document of value, whereby e.g. certain areas of the document of value are checked for the presence of stains. In certain areas of the document of value the checking for stains is difficult, e.g. when the stains are superimposed on a dark or a patterned, colored background of the document of value. Moreover, it is known to check documents of value for their limpness, e.g. with the help of ultrasonic measurements.

Starting out from the stated prior art, the invention is based on the object of providing a further method which can be used for checking the usage state of documents of value.

BRIEF SUMMARY OF THE DISCLOSURE

In the method according to the invention, for checking the usage state of a document of value, in particular the fitness of a document of value, the document of value is illuminated with illumination light and there is detected the light intensity of the light reflected from the document of value in order to take an image of the illuminated document of value. The image is taken using an image sensor which scans the document of value e.g. line by line. Upon the taking of the image of the document of value, there can be taken an image of the entire document of value or a partial image of the document of value. The image sensor can be configured to detect the light reflected from the document of value in several wavelength ranges and to take respectively one image of the document of value for each of the detected wavelength ranges.

Of the taken image there is chosen an image detail in which there is imaged an opaque, reflective section of the document of value. As an opaque, reflective section there is preferably chosen a section of the document of value which has relatively homogeneous optical properties, e.g. a section of uniform color, and which is at least partly reflective. In the chosen image detail there can be imaged an opaque, reflective security element of the document of value which is applied to the document of value or integrated in the document of value. In the chosen image detail there is imaged at least a partial area of the opaque, reflective security element. Preferably, the image detail is chosen such that edge areas of the opaque, reflective security element are excluded. The opaque, reflective section particularly is a partial area of an opaque, reflective foil element, for example of a metallized foil element. The opaque, reflective section, however, does not need to be a hundred percent opaque, but can also be semitransparent to the illumination light.

The term "reflected light" is used in the present application as a generic term for the light coming from the illuminated document of value which is observable on that side of the document of value from which also the illumination of the document of value is effected. Reflected light therefore refers to both diffusely reflected light and specularly reflected light as well as diffracted light and scattered light, insofar as these are observable on the side of the illumination.

The chosen image detail is examined the presence of and/or for signs of creases which may be present in the opaque, reflective section of the document of value. For this purpose, there are evaluated in particular the light intensities of the reflected light which are detected in the chosen image detail of the document of value. For example, the light intensities of all image points of the chosen image detail can be evaluated in order to examine the chosen image detail for signs of creases. The one or more results which the examination of the chosen image detail for creases yields are then used to evaluate the usage state of the document of value.

Upon examining the chosen image detail, there is determined for example an extent of creases present in the opaque, reflective section of the document of value. The extent of creases can be e.g. a statement about the area or about the area portion which is occupied by the creases in the opaque, reflective section of the document of value. The extent of creases in the opaque, reflective section can be determined with the help of the light intensities which are detected in the chosen image details. For example, the extent of creases is determined based on the light intensities of all image points of the chosen image detail. In a special embodiment example, upon examining the chosen image detail for signs of creases or upon determining the extent of creases, there is determined a number of image points of the chosen image detail whose light intensity exceeds a threshold value. In another special embodiment example, upon examining the chosen image detail for signs of creases or upon determining the extent of creases, there is determined a number of image points of the chosen image detail whose light intensity falls below a threshold value.

For taking the image of the document of value, the document of value can be illuminated with illumination light of several wavelength ranges, e.g. with light of several colors or with white light. Alternatively, for taking the image, the document of value can be illuminated with single-color light or with infrared light. Upon taking the image, the reflected light of several wavelength ranges can be simultaneously detected, e.g. by means of a broadband-sensitive sensor array, or alternatively by means of several sensor arrays or sensor lines which respectively are configured to detect a particular wavelength range of the reflected light, e.g. which respectively detect only light of a given color or only infrared light. Upon examining the chosen image detail for signs of creases, there are examined for example only those light intensities which are detected in a part of the several wavelength ranges of the illumination light, i.e. at least one of the wavelength ranges of the illumination light is not used for the evaluation for creases. For example, upon examining for signs of creases, there are evaluated only the light intensities detected in exactly one of the several wavelength ranges of the illumination light, for example only the light intensities detected in the infrared or only the light intensities detected upon a particular color.

The image detail to be chosen from the taken image can be different for different documents of value. Upon checking the usage state of the document of value, for example at first the type of the document of value is determined and the information about the type of the document of value is then used for choosing the image detail which is provided for the respective document of value. In particular, before choosing the image detail, the type of the document of value is determined and the image detail is chosen in dependence on the previously determined type of the document of value. The preceding determination of the type of the document of value can be effected automatically, e.g. using a different sensor with which the document of value is previously examined. The type of the document of value can also be automatically determined using information of the image taken by the image sensor. Alternatively, the type of the document of value can also be specified from outside, e.g. by an operator of the apparatus used for checking the document of value.

In a special embodiment example, the opaque, reflective section has holographic structures which form e.g. a visually perceptible security feature of the document of value. The holographic structures can be realized through openings in an opaque, reflective layer of the security element, e.g. in a metallization layer of the security element. If the opaque, reflective section which is imaged in the chosen image detail has holographic structures, the light reflected from the document of value is detected from a detection angle, with respect to the illumination light, which is different from the diffraction angles of the holographic structures. Diffraction angles here refer to those angles, at which, upon the wavelengths of the illumination light, the diffraction orders of the holographic structures are reflected. So as to block out, upon examining the chosen image detail, disturbances caused by the diffracted light, only the detected light intensities of a chosen wavelength range are used for the examination for signs of creases. The wavelength range whose detected light intensities are evaluated is chosen in dependence on the diffraction angle of the holographic structures. Upon checking the usage state of the document of value, for example at first the type of the document of value can be determined, and information about the type of the document of value can then be used for choosing the wavelength range whose light intensities are evaluated for the examination for creases. For example, from a plurality of detected wavelength ranges there is chosen the wavelength range suitable for the type of the document of value. The type of the document of value is determined before the check of the usage state of the document of value, in particular in the ways as described earlier in connection with the choosing of the image detail.

In some embodiment examples, the image of the document of value is taken by detecting light which is diffusely reflected from the illuminated document of value. For determining the extent of creases, in this case e.g. the number of image points of the chosen image detail is determined whose light intensity exceeds a threshold value. In other embodiment examples, the image of the document of value is taken by detecting light which is specularly reflected from the illuminated document of value. For determining the extent of creases in this case e.g. a number of image points of the chosen image detail is determined whose light intensity falls below a threshold value. The threshold values can be specified from outside or be determined by measurements before the check of the document of value. For the different types of documents of value there can be provided different threshold values. Depending on the type of the document of value which was determined before the check of the usage state, there can be chosen also the threshold value respectively provided for the type of document of value. For this purpose, the type of the document of value is determined before the check of the usage state of the document of value, in particular in the ways as described earlier in connection with the choosing of the image detail.

The invention furthermore relates to an apparatus for carrying out the described method. The apparatus has an image sensor which is configured to take the image of the document of value, and an evaluation unit which is configured to examine the chosen image detail for signs of creases which may possibly be present in the opaque, reflective section of the document of value. In particular, the evaluation unit is configured to determine the extent of creases in the opaque, reflective section. The evaluation unit can be arranged outside the image sensor or be part of the image sensor. For taking the image of the document of value, the light reflected from the document of value is preferably detected from a detection angle of 10° to 60° with respect to the illumination light, for example from a detection angle of 10° to 40°.

The examination, according to the invention, for creases in the opaque, reflective section of a document of value is preferably combined with other check methods for judging the usage state of the document of value, e.g. with a check for the presence of adhesive tape on the document of value and/or with a limpness check, e.g. by means of ultrasound, and/or with an optical check of the document of value for soilings such as e.g. stains and/or with an optical check for tears, missing parts of the document of value or dog-ears. For example, the usage state of the document of value is judged to be poor only when two or more of the check methods used indicate a poor usage state. The combination with the results of other check methods yields a more reliable check of the usage state of the document of value.

DESCRIPTION OF THE DRAWINGS

Further embodiment examples and advantages of the invention are explained in the following with reference to the Figures as well as the description thereof.

DETAILED DESCRIPTION OF PREFERRED EMBODIMENTS OF THE INVENTION

Figure 1A:
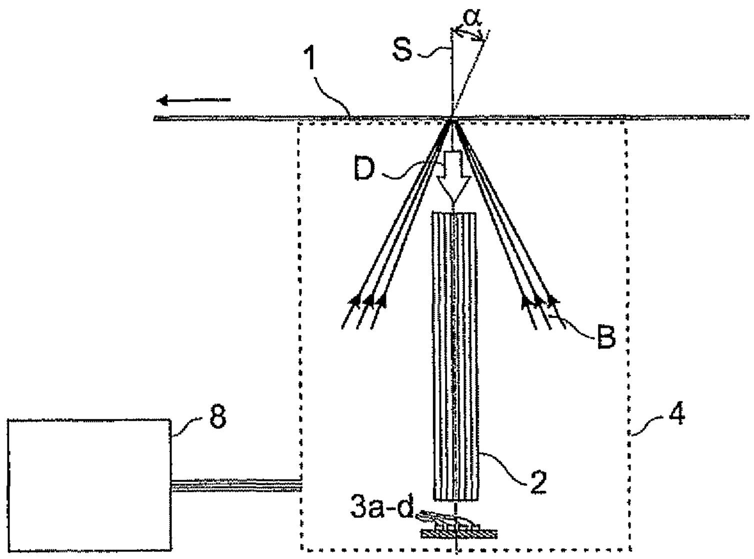
FIG. 1*a* shows an apparatus for carrying out the vertical detection of the diffusely reflected light.

In FIG. 1*a*, there is shown an image sensor 4 which takes an image of a document of value 1 which is transported past the image sensor 4. The arrow shown in FIG. 1*a* indicates the transport direction of the document of value 1. The image sensor 4 contains four sensor lines 3*a*-*d* which at every time of measurement take respectively one image line of the document of value 1. The image of the document of value 1 to be taken is composed of the image lines of one or more of the sensor lines 3*a*-*d*. Each of the sensor lines 3*a*-*d* detects light of a certain spectral range. For example, one of the sensor lines 3*a-d* is provided respectively for the red, green, blue and infrared spectral range. The document of value 1 is illuminated with illumination light B which is directed at an angle α to the perpendicular S onto the document of value 1 and focused on the document of value 1. The spectrum of the illumination light B extends e.g. over the entire visible spectral range into the near infrared range. As a light source there is used e.g. a white-light source here. For taking the image, that portion of the illumination light is detected which is diffusely reflected from the document of value 1 in a perpendicular direction and imaged on the sensor lines 3*a-d*. The imaging of the diffusely reflected light is effected e.g. by means of a Selfoc lens 2. The image sensor 4 is connected with an evaluation unit 8 to which the image sensor 4 transmits image information of the taken image, in particular image information on all four detected spectral ranges. The transmitted image information can be unprocessed or already pre-processed by the image sensor 4. The evaluation unit 8 processes the taken image of the document of value 1 in order to check the authenticity of the document of value 1 and/or to determine the type of the document of value 1 (e.g., denomination, currency) and to obtain information on the usage state of the document of value 1.

Figure 1B:
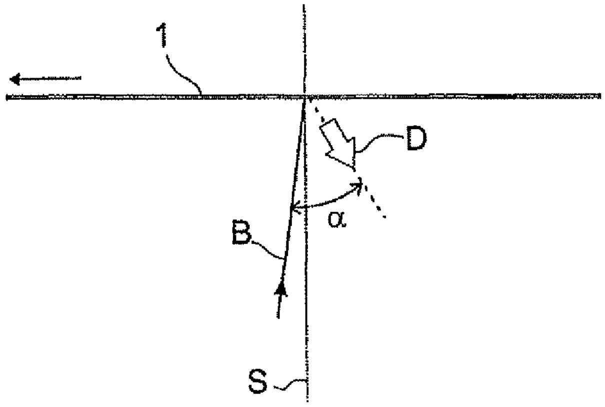
FIG. 1*b* shows a detail of an image sensor for the oblique detection of the diffusely reflected light.

FIG. 1*b* shows an alternative viewing geometry of the image sensor 4, whereby there is also detected light which is diffusely reflected from the document of value 1. In this example, both the illumination and the detection is effected obliquely to the perpendicular S, the illumination light, however, being irradiated at an angle to the perpendicular S which is different from that at which the detection light D is detected. As illumination light B there can be used spectrally narrow-band light, e.g. infrared light or light of a certain color.

Figure 2A:
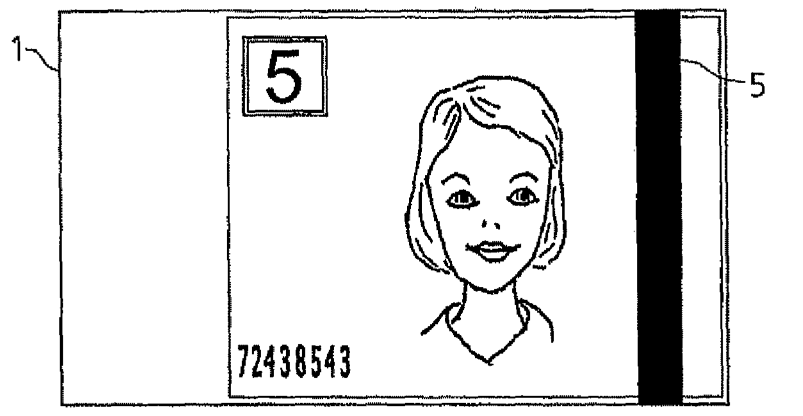
FIG. 2*a* shows an image of a document of value without creases taken under diffuse reflection.

For judging the usage state of the document of value 1 there is examined an opaque, reflective section of the document of value 1, e.g. a section of an opaque, reflective security element 5. In the present embodiment example of FIG. 2*a*, the opaque, reflective security element 5 is a foil strip applied to the document of value 1 which has a reflective metallization layer. In FIG. 2*a* there is schematically represented the image of the document of value 1 taken by the image sensor 4, which the latter has taken by detecting the light diffusely reflected from the document of value. The image shown in FIG. 2*a* may be the image of a narrow spectral range taken by a certain sensor line 3*a-d* or also the image of a broad spectral range, e.g. the total image which is formed from the detection signal of several of the sensor lines 3*a-d*. The document of value 1 of FIG. 2*a* has a good usage state (fit document of value), which is demonstrated, among other things, by the fact that the opaque, reflective security element 5 of the document of value 1 has a smooth surface. Due to the smooth surface, the illumination light B is specularly reflected, i.e. according to the laws of reflection, on the opaque, reflective security element 5. The image of FIG. 2*a*, however, was taken from a detection angle α outside the specular reflection, whereby only light reflected diffusely from the document of value 1 was detected. Since in this case only the light diffusely reflected from the document of value 1 was detected, the security element 5 appears dark in the image of FIG. 2*a*. The other areas of the document of value 1, however, appear, upon viewing the diffuse reflection, relatively bright.

Figure 2B:
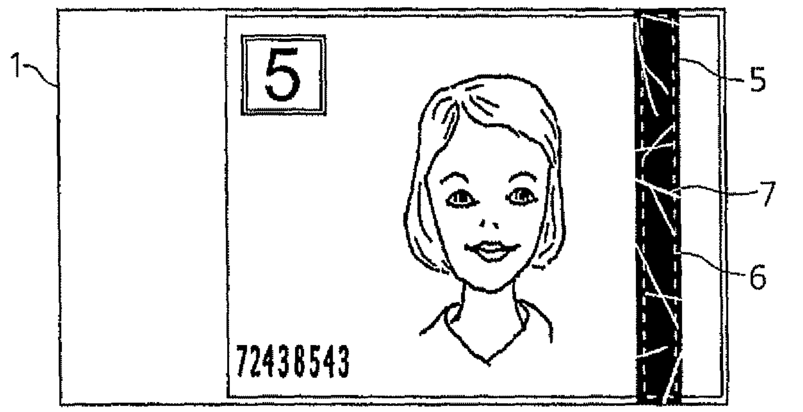
FIG. 2*b* shows an image of a document of value with creases taken under diffuse reflection.

In contrast, in FIG. 2*b* there is shown the image of a document of value 1 which has many creases which are a sign of a poor usage state of the document of value 1 (unfit document of value). In the area of the opaque, reflective security element 5, the creases 7 present there lead to bright lines or bright areas in the taken image. The image of FIG. 2*b* was also taken by detecting the light diffusely reflected from the document of value 1.

In a special embodiment example, in the opaque, reflective security element 5 of the document of value 1 there are incorporated holographic structures. Due to the light diffraction, the incident illumination light B is reflected on the holographic structures at certain diffraction angles which vary depending on the size of the holographic structures and depending on the wavelength of the illumination light B. When the detection angle α would be chosen such that it falls into one of the diffraction orders of the holographic structures, the holographic structures would appear as bright areas in the image taken (upon viewing the diffuse reflection). For judging the usage state of the document of value 1, the detection angle α is therefore preferably chosen such that it lies outside the diffraction angle of the holographic structures. This achieves the result that the holographic structures also appear as dark areas in the image taken under diffuse reflection. In case of a spectrally broad illumination, for judging the usage state there is preferably used the image taken in a given spectral range, e.g. taken by one or more chosen sensor lines. The spectral range here is chosen such that the diffraction orders which are reflected from the holographic structures in this spectral range lie outside the detection angle α.

Figure 2C:
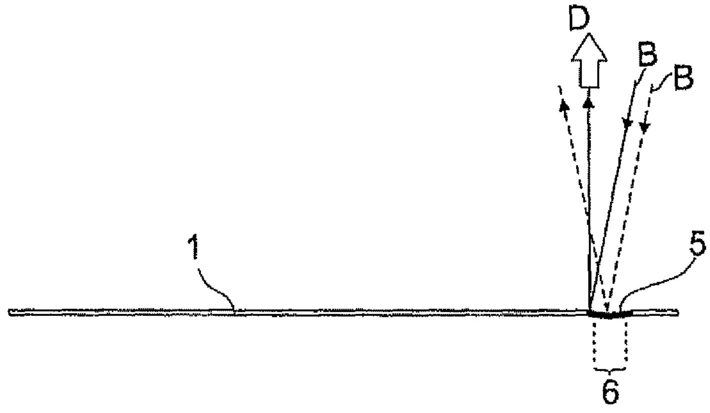
FIG. 2*c* shows a side view of the detection of the light reflected from an arched area of the document of value.

In certain cases it may happen that the opaque, reflective security element 5, even in a good usage state of the document of value, 1, has no flat surface. For example, a foil security element 5 which is relatively stiff mechanically and applied to a flexible document-of-value substrate, such as e.g. paper, may lead to an arching of the document of value 1 in the area of the applied foil element 5, see FIG. 2*c*. Because of this arching, the document of value 1 then has in the area of the security element 5 a tilted surface which in relation to the plane of the document of value 1 is tilted e.g. by a few degrees. Typically, the arching of the document of value 1 is such that the tilt angle in the center of the security element 5 is small, while it increases toward the edge of the security element 5. Especially in the edge area of the security element 5, the relatively large tilt angle may lead to the fact that illumination light B, which is specularly reflected from this edge area, is detected by the image sensor 4, although the sensor lines 3*a-d* of the image sensor 4 are arranged such that they, in relation to the plane of the document of value, only detect diffusely reflected light. In FIG. 2*c*, the continuous lines show the optical path of the illumination light B upon specular reflection on the tilted edge of the security element 5, while the dashed lines indicate the optical path of the illumination light B upon specular reflection in the center of the security element 5. Of the central area of the security element 5 the image sensor 4 therefore captures diffusely reflected light, while of the edge area it captures specularly reflected light. The tilted edge area may thus lead, even in a good usage state of the document of value 1, to specular reflections which are captured by the image sensor 4, despite its arrangement for capturing the diffuse reflection. So as to exclude the light specularly reflected from the edge area, for judging the usage state of the document of value 1, therefore, a certain image detail 6 is chosen. The chosen image detail 6 comprises only a central area of the security element 5, while the edge area of the security element 5 is excluded.

Figure 3:
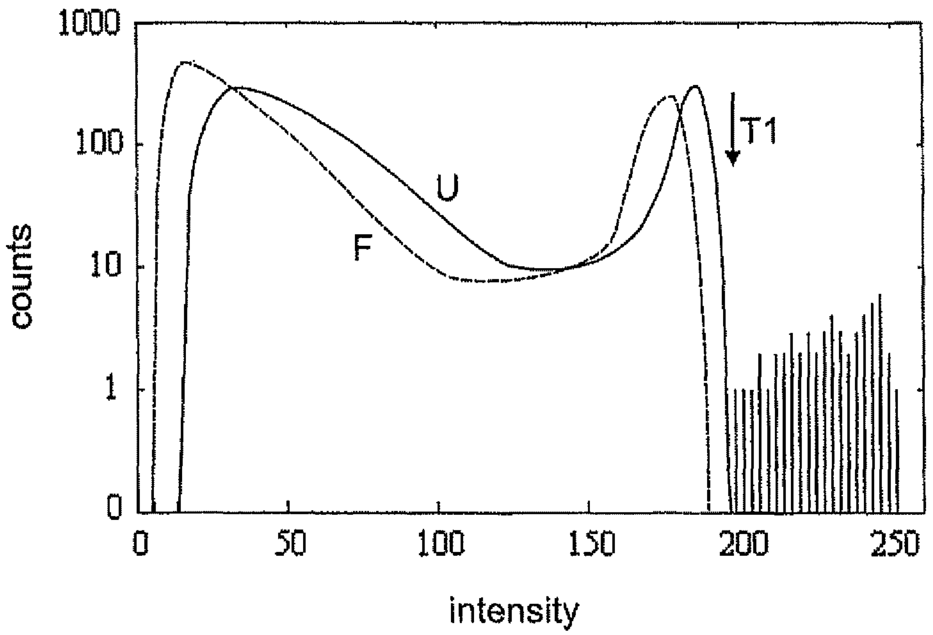
FIG. 3 shows a diagram for evaluating the detected light intensities.

The chosen image detail 6 is then examined for creases 7. The creases 7 appear in the image taken under diffuse reflection as bright lines or strips, see FIG. 2*b*. A simple method for examining the image detail 6 for creases 7 is explained with reference to FIG. 3. In FIG. 3, the detected light intensities of all image points of the chosen image detail 6 are represented in the form of a histogram, firstly, for a document of value with good usage state (fit document of value, histogram data F) and, secondly, for a document of value with a poor usage state (unfit document of value, histogram data U). Compared to the histogram data F (fit document of value), in the histogram data U (unfit document of value) the frequency distribution is shifted to higher light intensities. Light intensities above about 200 on the chosen scale are not detected at all upon the fit document of value, but only upon the unfit document of value. As a measure of the presence of creases 7 in the chosen image detail 6 there can thus be used e.g. the number of image points whose light intensity lies above a given threshold value T1. The number of image points with light intensity above the threshold value T1 is a measure of the size of the surface area which is occupied by the creases 7 in the chosen image detail 6. In this way, there can thus be determined the extent of creases 7 in the image detail 6. The threshold value T1 can be specified individually for the respective type of document of value and be ascertained e.g. by corresponding measurements on a plurality of documents of value prior to the check of the document of value 1.

Alternatively, the extent of creases 7 in the image detail 6 can also be determined from the light intensity integrated over several image points of the image detail 6 or from an average value of the light intensities of several image points of the image detail 6. The check for creases 7 can of course also be carried out using other methods which are known in the field of image processing. For example, there can also be used image processing methods which have been developed specifically for locating line- or strip-shaped areas in an image. For example, for this purpose, there can be carried out direction-independent line filterings of the image information or also Hough transformations of the image information.

Figure 4:
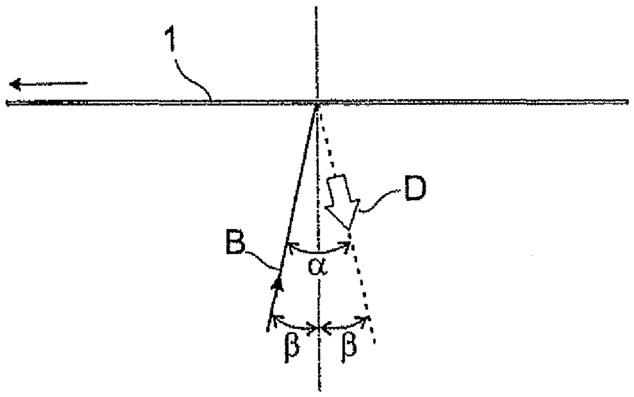
FIG. 4 shows a detail of an image sensor for detecting the specularly reflected light.
Figure 5:
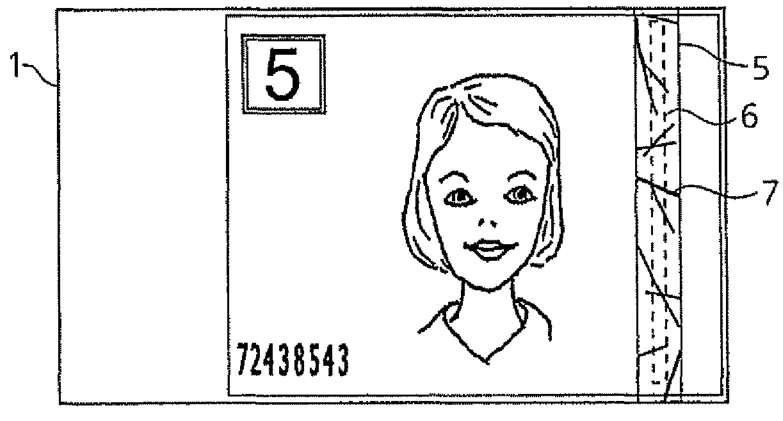
FIG. 5 shows an image of a document of value with creases taken under specular reflection.

An alternative embodiment example is shown in the FIGS. 4 and 5. In this embodiment example, there is taken an image of the document of value 1 by detecting the specularly reflected light. In this case, the angle of incidence β of the illumination light B is equal to the angle of reflection β of the detection light D, see FIG. 4. The image of the document of value 1 taken in this way is shown in FIG. 5. The opaque, reflective security element 5 appears, upon viewing the specular reflection, as a bright area, the creases 7, however, as dark lines or strips in this bright area. For the examination for signs of creases 7, there is again chosen an image detail 6, for example a narrow strip in the center of the security element 5, so that the edge area of the security element 5 is excluded. The examination of the chosen image detail 6 for creases 7 can be effected analogous to the preceding embodiment examples. As extent of creases 7, in this case there could be used e.g. the number of image points of the image detail 6 whose detected light intensity lies below a predetermined threshold value T2. The threshold value T2 could be chosen, analogous to T1 of FIG. 3, to be at the lower end of a frequency distribution obtained under specular reflection, so that only the light intensities of the image points in the area of the creases 7 lie below the threshold value T2.

The invention claimed is:

1. A method for checking the usage state of a document of value comprising the steps:

illuminating the document of value with illumination light, taking an image of the document of value by detecting light intensities of the light reflected from the illuminated document of value, choosing an image detail of the taken image in which an opaque, reflective section of the document of value is imaged, the opaque, reflective section being at least a partial area of an opaque, reflective foil element of the document of value, examining the chosen image detail for signs of creases which may possibly be present in the opaque, reflective section of the document of value, and using a result of the examining for judging the usage state of the document of value.

2. The method according to claim 1, wherein upon examining the chosen image detail for signs of creases, evaluating light intensities of the reflected light which are detected in the chosen image detail.

3. The method according to claim 1, wherein upon examining the chosen image detail for signs of creases, determining for the opaque, reflective section an extent of creases.

4. The method according to claim 1, wherein before choosing the image detail, determining the type of the document of value and choosing the image detail in dependence on the type of the document of value.

5. The method according to claim 1, wherein upon examining the chosen image detail for signs of creases, determining the number of image points of the chosen image detail whose light intensity exceeds a threshold value or the number of image points of the chosen image detail whose light intensity falls below a threshold value.

6. The method according to claim 1, wherein upon taking the image of the document of value, the document of value is illuminated in several wavelength ranges, and upon examining the chosen image detail for signs of creases, evaluating only those light intensities which are detected in a part of the several wavelength ranges.

7. The method according to claim 1, wherein the image detail is chosen such that edge areas of the opaque, reflective security element are excluded.

8. The method according to claim 1, wherein the reflected light, with respect to the illumination light, is detected at a detection angle of 10° to 60°.

9. The method according to claim 1, wherein the opaque, reflective section is a partial area of an opaque, reflective security element of the document of value.

10. The method according to claim 1, wherein, if the opaque, reflective section has holographic structures, the reflected light is detected at a detection angle, with respect to the illumination light, which differs from the diffraction angles at which, upon illumination by the wavelengths of the illumination light, the diffraction orders of the holographic structures are reflected.

11. The method according to claim 1, wherein, if the opaque, reflective section has holographic structures, upon examining the chosen image detail for signs of creases, evaluating the light intensities detected in a chosen wavelength range which is chosen in dependence on diffraction angles of the holographic structure.

12. The method according to claim 11, wherein before checking the usage state of the document of value, determining the type of the document of value and using the information of the type of the document of value as a basis for selecting the wavelength range whose light intensities are evaluated upon the examination for signs of creases.

13. The method according to claim 1, wherein the image of the document of value is taken by detecting light which is diffusely reflected from the illuminated document of value, and for determining the extent of creases, determining the number of image points of the chosen image detail whose light intensity exceeds a threshold value.

14. The method according to claim 1, wherein the image of the document of value is taken by detecting light which is specularly reflected from the illuminated document of value, and for determining the extent of creases, determining a number of image points of the chosen image detail whose light intensity falls below a threshold value.

15. An apparatus for checking the usage of a document of value, the apparatus comprising:

a light source configured to illuminate the document of value with illumination light;

an image sensor configured to take an image of the document of value by detecting light intensities of light reflected from the illuminated document of value; and an evaluation unit configured to choose an image detail of the taken image in which an opaque, reflective section of the document of value is imaged, the evaluation unit further being configured to perform an examination of the chosen image detail for signs of creases which may possibly be present in the opaque, reflective section of the document of value, the opaque, reflective section being at least a partial area of an opaque, reflective foil element of the document of value, wherein the evaluation unit is configured to determine the extent of creases in the opaque, reflective section, and wherein a result of the examination is used to judge the usage state of the document of value.

* * * * *